(12) United States Patent
Kubo

(10) Patent No.: US 8,616,256 B2
(45) Date of Patent: Dec. 31, 2013

(54) RADIAL TIRE FOR MOTORCYCLE

(75) Inventor: Yukihiko Kubo, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1221 days.

(21) Appl. No.: 12/094,002

(22) PCT Filed: Nov. 9, 2006

(86) PCT No.: PCT/JP2006/322379
§ 371 (c)(1),
(2), (4) Date: Sep. 18, 2008

(87) PCT Pub. No.: WO2007/058116
PCT Pub. Date: May 24, 2007

(65) Prior Publication Data
US 2009/0090448 A1    Apr. 9, 2009

(30) Foreign Application Priority Data

Nov. 18, 2005 (JP) .................. 2005-333990

(51) Int. Cl.
*B60C 9/18* (2006.01)

(52) U.S. Cl.
USPC ........... 152/532; 152/526; 152/527; 152/530; 152/534; 152/535; 152/537

(58) Field of Classification Search
USPC .......... 152/526, 527, 530, 532, 534, 535, 537
See application file for complete search history.

(56) References Cited

U.S. PATENT DOCUMENTS

| | | | |
|---|---|---|---|
| 4,150,703 A * | 4/1979 | Sons, Jr. ........................ | 152/538 |
| 2004/0159382 A1* | 8/2004 | Armellin et al. .............. | 152/151 |

FOREIGN PATENT DOCUMENTS

| | | | |
|---|---|---|---|
| JP | 55091406 A | * | 7/1980 |
| JP | 62-143705 A | | 6/1987 |
| JP | 03-169713 A | | 7/1991 |
| JP | 03169713 A | * | 7/1991 |
| JP | 05-004503 A | | 1/1993 |
| JP | 08-048109 A | | 2/1996 |
| JP | 2001-253207 A | | 9/2001 |
| JP | 2002-316512 A | | 10/2002 |
| JP | 2005-247062 A | | 9/2005 |

OTHER PUBLICATIONS

JPO English Abstract for JP 55091406, 1980.*
JPO English Abstract for JP 03169713, 1991.*
English machine translation of JP 2001-253207, retrieved from JPO database Sep. 22, 2011.*
Translation of JP 03169713, USPTO Translation Branch, Aug. 2013.*
Japanese Office Action issued in Japanese Application No. 2007-545215 dated May 17, 2011 (with translation).

* cited by examiner

*Primary Examiner* — Timothy Kennedy
(74) *Attorney, Agent, or Firm* — Sughrue Mion, PLLC

(57) ABSTRACT

A radial tire for a motorcycle capable of having high road grip performance both when running at a high speed on a dry road surface and when cornering at a high speed, together with the high speed durability, especially a radial tire for a motorcycle with a large displacement to be used for road races, capable of maintaining these performances until the end of the races, is provided. The tilting angles of the cords 13a of said cross-belt 13 are set to 60 degrees or more to the circumferential direction, and a belt protecting layer 15 is disposed outside the spiral-belt 14, the belt protecting layer 15 having cords arranged in the direction tilted at 70 degrees or more to the circumferential direction.

9 Claims, 5 Drawing Sheets

RADIAL TIRE FOR MOTORCYCLE

TECHNICAL FIELD

This invention relates to a radial tire for a motorcycle comprising a cross-belt consisting of two layers of belt plies having cords arranged in the opposite direction to each other with regard to the equator of the tire and a spiral-belt disposed radially outside the cross-belt, having a cord(s) wound in the circumferential direction, and especially relates to a radial tire for a motorcycle with a large displacement to be used for road races, having high road grip performance when cornering at a high speed on a dry road surface and high speed durability to maintain this performance until the end of the race.

RELATED ART

There is already known a radial tire for a motorcycle as shown in the lateral cross section view of the tire of FIG. 1 and in the expansion view of the belt of FIG. 2, having a radial carcass 93 consisting of one or more layers of carcass ply 92 with both of its side portions fixed to the bead cores 91, a cross-belt consisting of two layers of belt plies 94, 95 having cords arranged in the opposite direction to each other with regard to the equator of the tire and a spiral-belt 97 with a cord(s) wound in the circumferential direction, the spiral-belt disposed adjacent to the outside of the cross-belt in the radial direction, wherein the tilting angles $\theta_1$, $\theta_2$ of the cords of the cross-belt are generally set to 30 degrees or less to the circumferential direction (See Patent Document 1). It is noted that symbol 99 is for a tread rubber which is a part of the tire that contacts the road surface.

Patent Document 1: Japanese Patent Application Laid-open No. H05-004503 (JP1993004503A)

DISCLOSURE OF THE INVENTION

It is a current situation that the requirements for a motorcycle capable of running at a higher speed with higher torque have been getting stronger, especially for a motorcycle with a large displacement to be used for road races, not only the higher road grip performance at a high speed necessary for a motorcycle with higher torque, but also the higher road grip performance when cornering at a high speed are required, and in addition, it is a requisite to maintain these performance until the end of the race. Under this situation, however, the aforementioned tire according to the prior art is liable to be degraded in an early stage when the repetition of large deformations is input to the tread rubber, due to the fact that the allowable deformation of the spiral-belt is too small for its in-plane shear strain. It is also a problem that such a conventional tire does not have the road grip performance necessary when cornering, due to the low rigidity against the bending deformation in the tire lateral plane.

This invention has been conceived in view of such a problem, and it is, therefore, an object of the present invention to provide a radial tire for a motorcycle capable of having high road grip performance both when running at a high speed on a dry road surface and when cornering at a high speed, together with the high speed durability, especially a radial tire for a motorcycle with a large displacement to be used for road races, capable of maintaining these performances until the end of the races.

(1) The present invention provides a radial tire for a motorcycle comprising: a radial carcass consisting of at least one carcass plies, a cross-belt disposed radially outside of the carcass plies and consisting of two layers of belt plies having cords arranged in the opposite direction to each other with regard to the equator of the tire, and a spiral-belt disposed radially adjacently outside the cross-belt, the spiral-belt having a cord wound in the circumferential direction, wherein the tilting angles of the cords of said cross-belt are set to 60 degrees or more with regard to the circumferential direction, and a belt protecting layer is disposed outside said cross-belt, the belt protecting layer having synthetic fiber cords arranged in the direction tilted at 70 degrees or more with regard to the circumferential direction.

(2) The present invention provides a radial tire for a motorcycle according to the invention in item (1), wherein said belt protecting layer is placed outside the spiral-belt.

(3) The present invention provides a radial tire for a motorcycle according to the invention in item (1) or (2), wherein a cushion rubber layer is disposed between the cross-belt and the spiral-belt, the thickness of the cushion rubber layer being in the range of 0.3 mm to 1.5 mm.

(4) The present invention provides a radial tire for a motorcycle according to the invention in any one of items (1) to (3), wherein the tilting angle of the cords of said belt protecting layer is set to 90 degrees with regard to the circumferential direction.

(5) The present invention provides a radial tire for a motorcycle according to the invention in any one of items (1) to (4), wherein the elastic modulus of the cords arranged in said belt protecting layer is 12 cN/tex or more at 3% elongation.

According to the invention in item (1), a belt protecting layer having cords arranged in the direction tilted at 70 degrees or more to the circumferential direction is disposed outside said cross-belt, so that the belt protecting layer is capable of allowing the deformation caused by its in-plane shear strain being input when running at a high speed on a dry road surface and also when cornering at a high speed, therefore, the belt protecting layer reduces the burden in the deformation on the tread rubber and suppress the rubber deterioration coming from it, hence the high road grip performance can be maintained for long time.

Furthermore, since the belt protecting layer has cords made from synthetic fiber, it has a high flexibility in the elongation, therefore, the belt protecting layer can have the durability higher than tread rubber against the in-plane shear strain being input. Hence, the belt protecting layer is not degraded in an early stage.

According to this invention, in addition to the fact that the tilting angles of the cords of the belt protecting layer to the circumferential direction is 70 degrees or more, the tilting angles of the cords of the cross-belt are set to 60 degrees or more to the circumferential direction, which is higher than conventional tires, so that the rigidity against the bending deformation in tire lateral direction is enhanced, as a result, a road grip performance of the tire is also enhanced.

According to the invention in item (2), the belt protecting layer is placed outside the spiral-belt, so that the aforementioned effect to reduce the burden in the deformation on the tread rubber and to suppress the rubber deterioration coming from it, hence to maintain the high road grip performance for long time, is further enhanced.

According to the invention in item (3), a cushion rubber layer is disposed between the cross-belt and the spiral-belt, so that the deformation due to the in-plane shear strain can be further effectively absorbed when running at a high speed on a dry road surface and when cornering at a high speed.

However, the in-plane shear deformation cannot be effectively absorbed, when the thickness of the cushion rubber layer is less than 0.3 mm, and, when its thickness is more than 1.5 mm, the heat generated by the deformation is increased. As a result, this reduces the durability.

According to the invention in item (4), the tilting angle of the cords of the belt protecting layer is set to 90 degrees to the circumferential direction, so that it increases the rigidity against the lateral bending deformation, hence, enables higher road grip performance when cornering, and also, because of the fact that the cords of the spiral-belt and the belt protecting layer cross each other at a right angle, the dependency on the direction of the rigidity against the bending deformation can be suppressed and this gives comfortable feeling about the rigidity and contributes to the improvement in the road grip performance, as well.

According to the invention in item (5), the elastic modulus of the cords arranged in said belt protecting layer is 12 cN/tex or more at 3% elongation, so that it can hold a flexibility together with appropriate rigidity, therefore, the high grip performance and the durability are both achieved at the same time.

REFERENCE SYMBOLS

Figure 1:
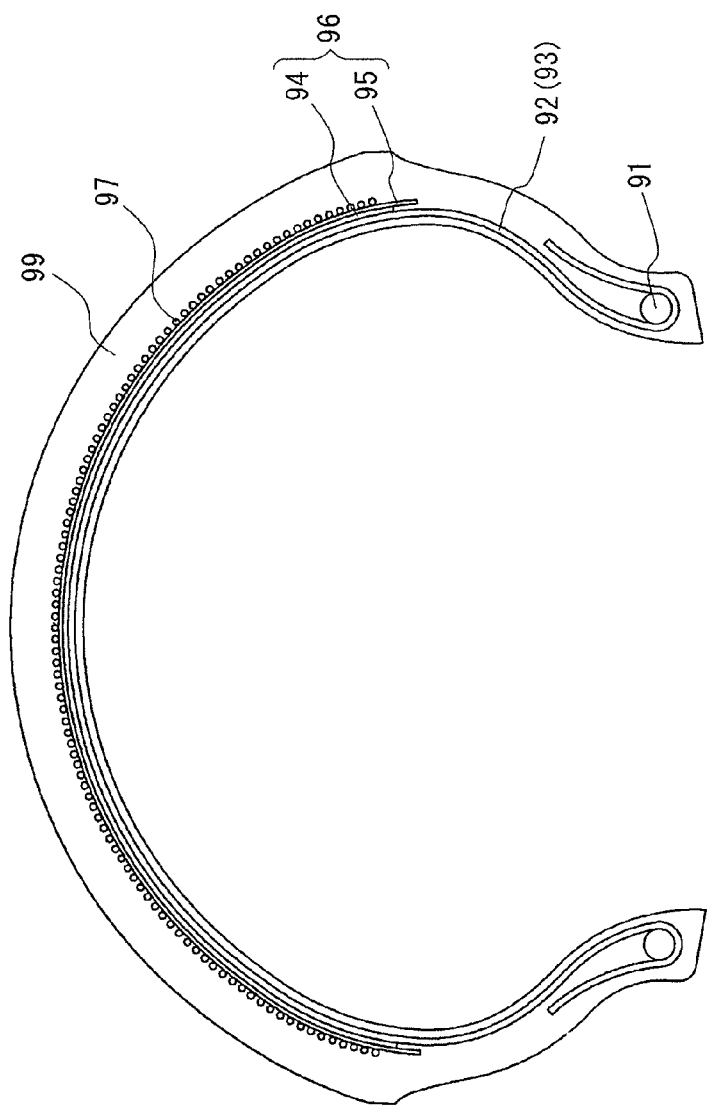
FIG. 1 is a lateral cross-sectional view showing a conventional tire.

1 Bead core
2 Side portion of carcass ply
3 Center portion of carcass ply
4 Carcass ply
5 Radial Carcass
6 Tread Rubber
10 Tire for motorcycle
11,12 Belt ply
11a,12a Cord of Belt ply
13 Cross-belt
14 Spiral-belt
14a Cord of spiral-belt
15 Belt protecting layer
15a Cord of belt protecting layer
16 Cushion rubber

BEST MODE FOR CARRYING OUT THE INVENTION

Figure 3:
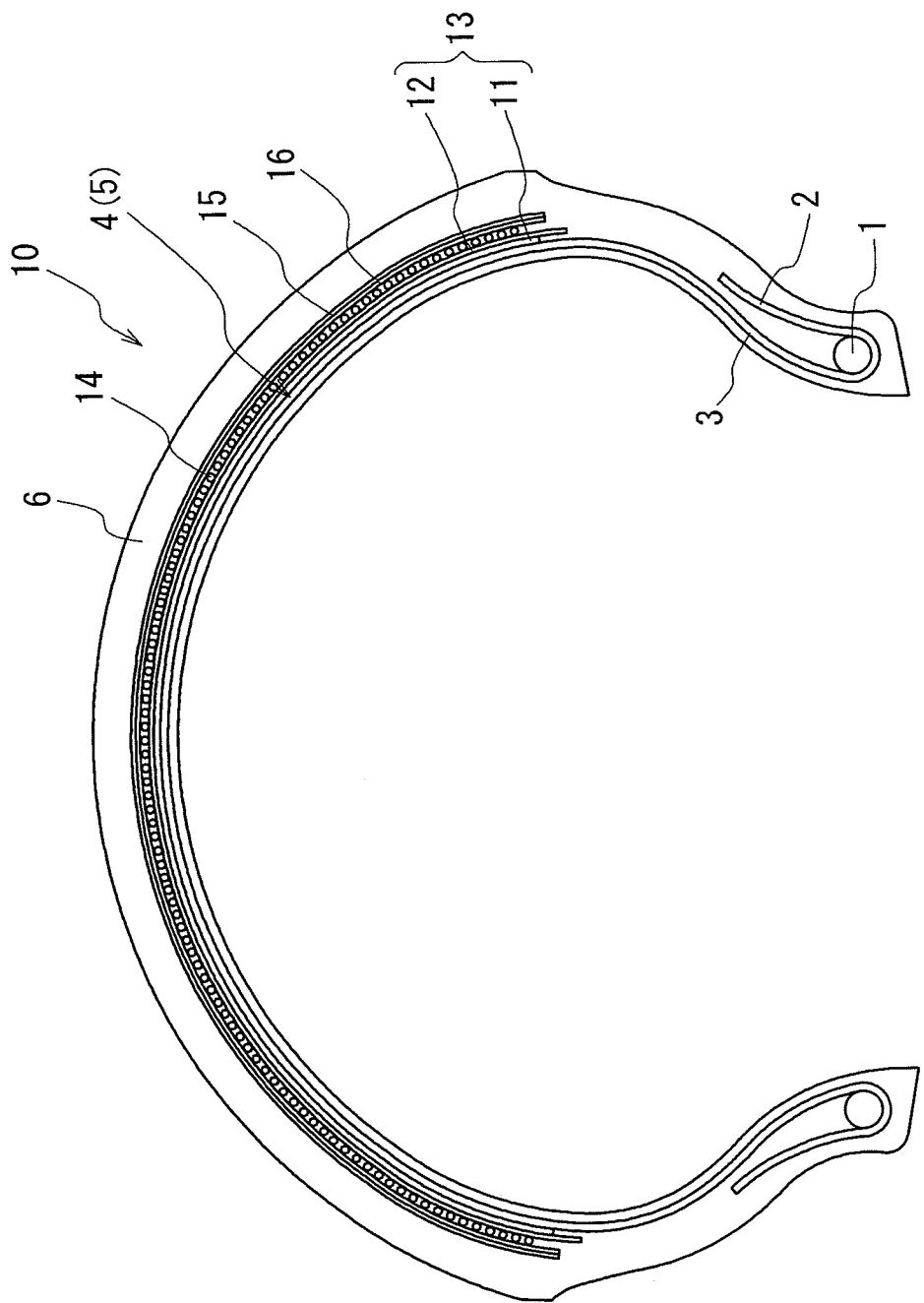
FIG. 3 is a lateral cross-sectional view showing a tire of the present invention.
Figure 4:
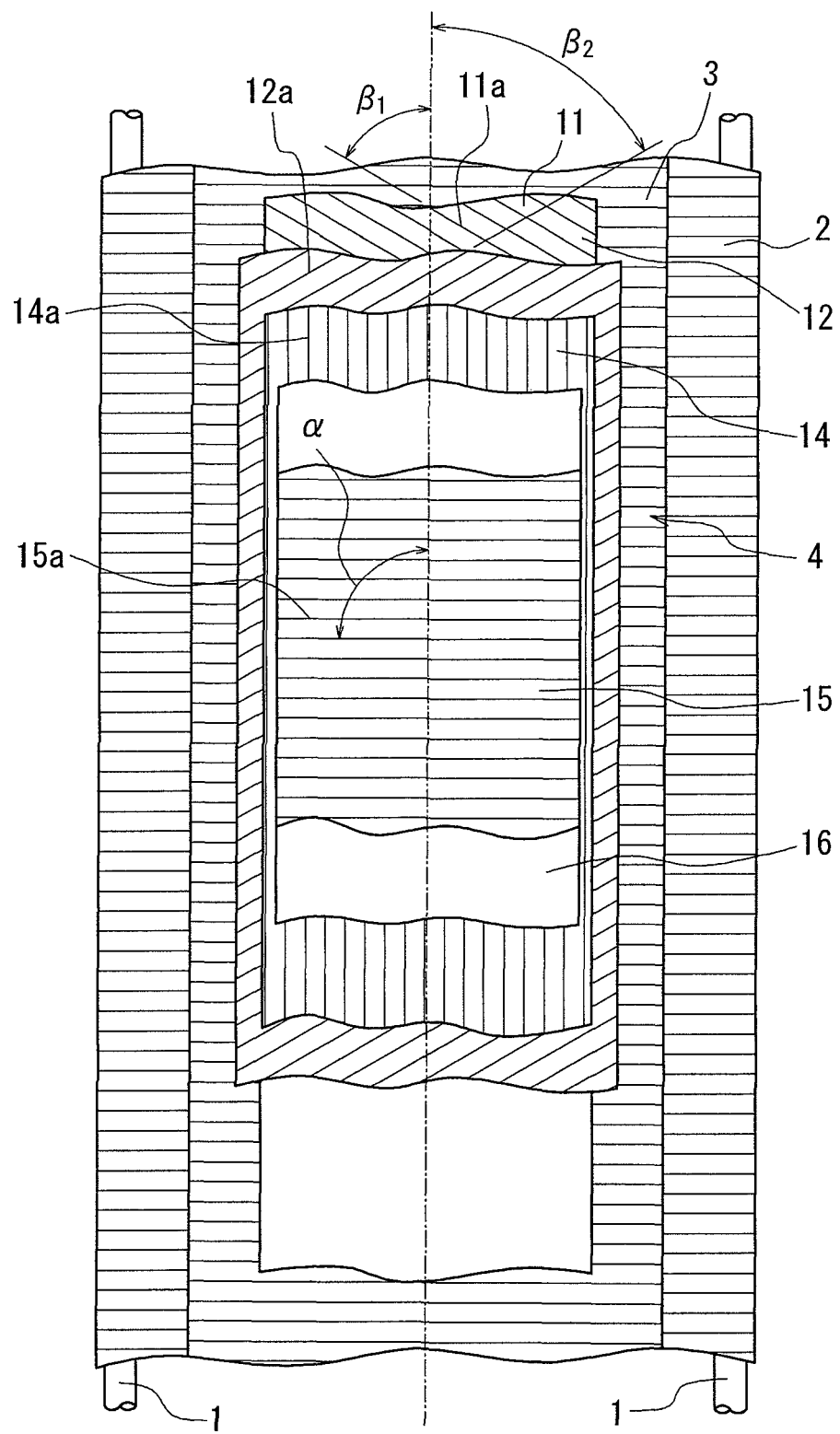
FIG. 4 is an expansion view of a belt structure, viewed from the radial outside of a tire of the present invention.

An embodiment of the present invention will be described hereinafter with reference to the drawings. FIG. 3 is a lateral cross-sectional view at the plane including the center axis showing a radial tire for a motorcycle of this embodiment and FIG. 4 is an expansion view of the cross-belt, the spiral-belt and the belt protecting layer, viewed from the radial outside of the tire. A radial motorcycle tire 10 comprises; a radial carcass 5 consisting of one or more layers of carcass ply 4 with both of its side portions 2 turned up around the bead cores 1 respectively, and its center portion 3 extended toroidally between these bead cores 1; a cross-belt 13 consisting of two layers of belt plies 11, 12 having cords arranged in the opposite direction to each other with regard to the equator of the tire; a spiral-belt 14 with a cord(s) wound in the circumferential direction, disposed adjacent to the outside of the cross-belt in the radial direction, and a tread rubber 6 placed radially outside the spiral-belt 14.

The tire of the present invention 10, as one of its characteristics, further comprises a belt protecting layer disposed between the cross-belt 13 and the tread rubber 6, having cords arranged with a tilting angle α of 70 degrees or more to the circumferential direction, therefore, is capable of improving the durability of the tread rubber 6 by absorbing and reducing the shear stress input into the tread rubber 6 by means of the belt protecting layer. In addition, it is another one of the characteristics of the tire 10 that the tilting angles $\beta_1$, $\beta_2$ of two layers of belt plies 11, 12 constituting the cross-belt 13 are set to 60 degrees or more to the circumferential direction, and this further increases the rigidity when cornering.

It is noted that with regard to the positional relation of the spiral-belt and the belt protecting layer, both of which are disposed between the cross-belt and the tread rubber, it is preferable to place the belt protecting layer outside the spiral-belt, and with this relation, the aforementioned effect can be further enhanced.

Also, it is preferable to dispose a cushion rubber layer with the thickness of 0.3 mm to 1.5 mm between the cross-belt and the spiral-belt, and with this configuration, the shear deformation can be effectively absorbed.

It is preferable that the tilting angle α of the cords 15a of the belt protecting layer 15 is set to 90 degrees to the circumferential direction, so that this increases the bending rigidity when cornering, hence, it enables to obtain a high road grip performance, and with the cooperation of the cord(s) of spiral belt wound in the circumferential direction it also enables to obtain the independency of the rigidity on the directions, which contributes to the improvement in the road grip performance, as well.

It should be noted as to the cords 15a constituting the belt protecting layer 15 that its elastic modulus is preferably 12 cN/tex or more at 3% elongation, so that it can hold a flexibility together with appropriate rigidity, therefore, the high grip performance and the durability are both achieved at the same time.

The material for the carcass ply can be Nylon 66 or the like, on the other hand, it is preferred that aromatic aramid fiber is used as a material for the cords 11a, 12a of the belt plies 11, 12 and a steel cord(s) is used as a material for the cord(s) 14a of the spiral-belt 14.

As the material of the cushion rubber layer it is preferable to select the one with JIS hardness of 35-45 degrees.

It is preferable to configure the spiral-belt width to be in the range of 80-120% of the wider of two belt plies 11,12, this is because the road grip performance is decreased when cornering if the width of the spiral-belt is less than 80%, on the other hand, if the width of the spiral-belt is larger than 120%, the durability of sidewall portion is degraded because the spiral-belt extends into the sidewall portions.

Furthermore, the width of the belt protecting layer 15 is preferably in the range of 80-120% of the spiral-belt 14, because the road grip performance is decreased when cornering if the width of the belt protecting layer 15 is less than 80% and the durability of the belt protecting layer 15 is reduced if the width of the belt protecting layer 15 is over 120%.

Also, the width of the cushion rubber layer 16 is preferably in the range of 80-100% of the spiral-belt 14, because the shear deformation cannot be well reduced when cornering if the cushion rubber layer 16 is less than 80%, on the other hand, the durability gets down due to the increase of the heat if the width of the cushion rubber layer 16 is over 100%.

Tread rubber 5 can consist of one layer, however, it is preferred to configure it by placing at the tire surface side a top-rubber layer with the JIS hardness of 40-50 degrees and placing in its radial inside a base-rubber layer with a hardness lower than the top-rubber layer, so that the heat generation is suppressed at straight running to contribute the improvement of the durability.

TESTING EXAMPLE

Figure 2:
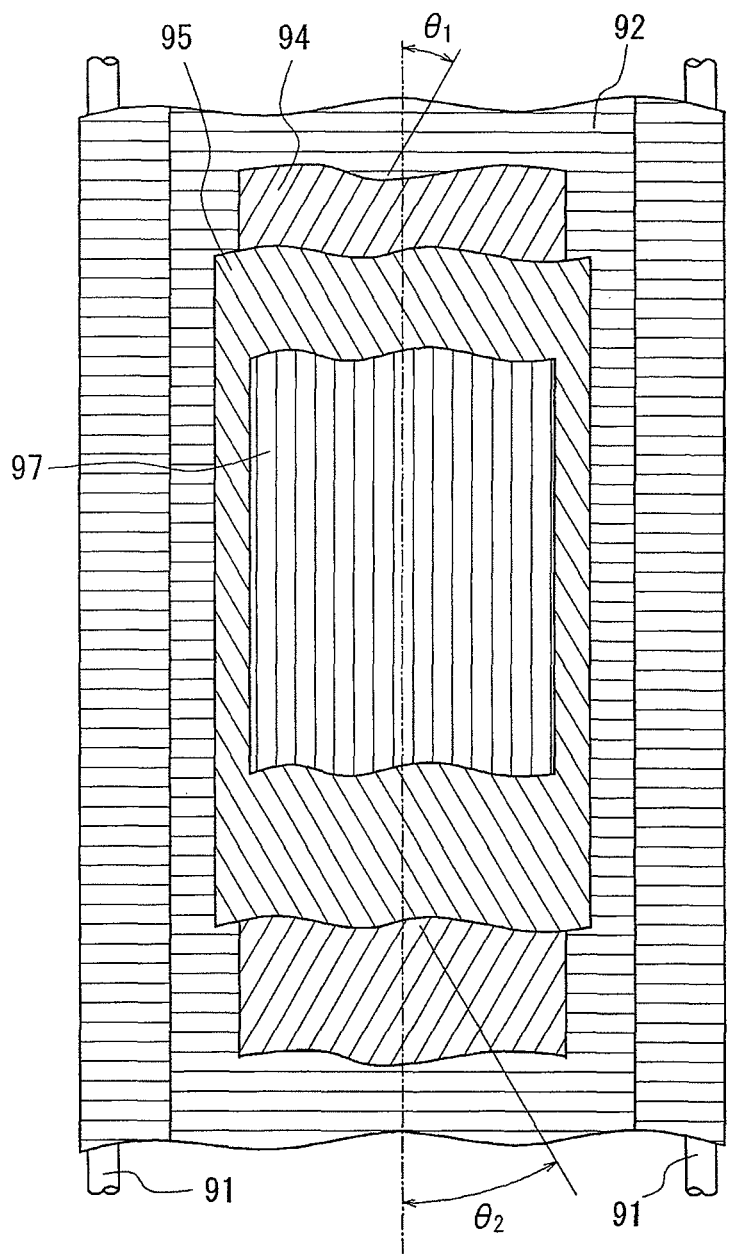
FIG. 2 is an expansion view of a belt structure, viewed from the radial outside of a conventional tire.
Figure 5:
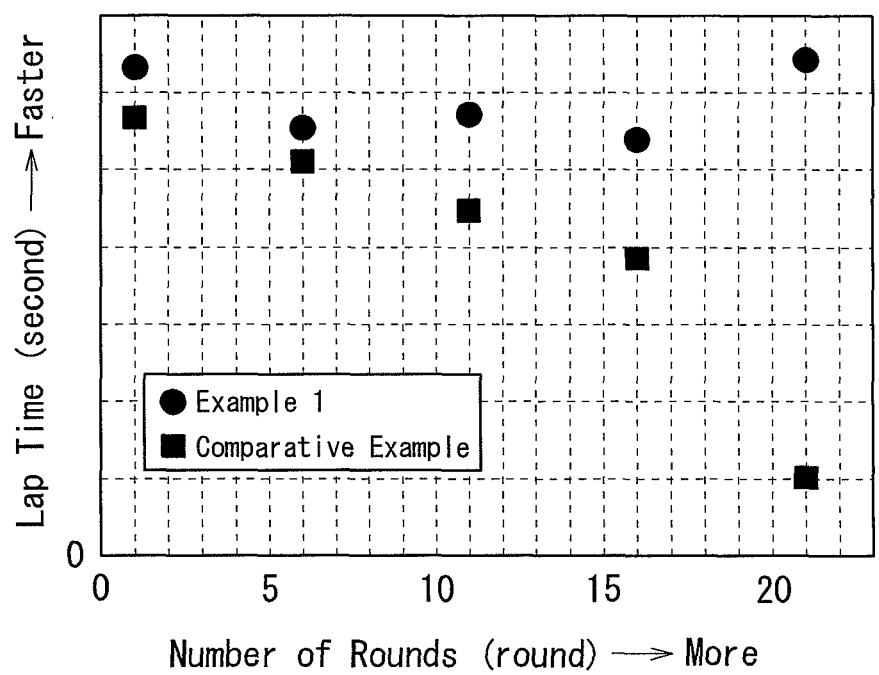
FIG. 5 is a graph showing the results of the lap time on a circuit course for the example tires and the comparative example tire.

Tires having the construction shown in FIG. 3 and FIG. 4, as Example 1 and Example 2, were experimentally manufactured, then equipped on a test motorcycle and sensory evaluated by a rider. A tire shown in FIG. 1 and FIG. 2 as Comparative Example was evaluated in the same manner. As to Example 1 and Comparative Example, lap time on the circuit course was also recorded and the sustainability of the performance was evaluated. The tire specifications and the results of the sensory evaluation by the rider are described in Table 1 and the results of the measurements of the lap time are shown if FIG. 5.

Tire sizes for all of Examples were 190/650R16.5 for the front wheel and 125/600R16.5 for the rear wheel. For all Examples, including Comparative Example, the quantity of the layers of the carcass plies constituting the radial carcass is one, the material for the carcass ply was aromatic aramid fiber, the material for the cords of the cross-belt was also aromatic aramid fiber, and the tilting angle to circumferential direction of the cords of the cross-belt was 75 degrees

TABLE 1

| | Items | Example 1 | Example 2 | Comparative Example |
|---|---|---|---|---|
| Tire specifications | Cord angle of cross-belt to circumferential direction | 75 degrees | 75 degrees | 75 degrees |
| | Material of cord of spiral-belt | steel cord | aramid | steel cord |
| | Material of cord of belt protecting layer | aramid | aramid | non |
| | Cord angle of belt protecting layer to circumferential direction | 90 degrees | 90 degrees | non |
| Sensory evaluation by rider | High speed straight-running stability | 10 | 10 | 10 |
| | High speed cornering stability | 12 | 11 | 10 |
| | Road grip sustainability | 18 | 15 | 10 |
| | Traction performance | 12 | 11 | 10 |
| | Grip at full bank cornering | 13 | 10 | 10 |

Sensory evaluation by the rider in the Table 1 is represented by the index with a score of 10 for the Comparative Example. It is also noted that the larger the number is, the better the performance is. It can be seen from Table 1 and FIG. 5 that the tires of Example 1 and Example 2 is superior to the tire of Comparative Example in all the items evaluated.

This invention can be applied for a tire for a motorcycle, especially for a motorcycle with high speed and high discharge.

The invention claimed is:

1. A radial tire for a motorcycle comprising: a radial carcass consisting of at least one carcass ply, a cross-belt disposed radially outside of the carcass ply and consisting of two layers of belt plies having cords arranged in the opposite direction to each other with regard to the equator of the tire, and a spiral-belt disposed radially adjacently outside the cross-belt, the spiral-belt having a cord wound in the circumferential direction, wherein the tilting angles of the cords of said cross-belt are set to 60 degrees or more measured from the circumferential direction, and a belt protecting layer is disposed outside said cross-belt, the belt protecting layer having synthetic fiber cords arranged in a direction tilted at 70 degrees or more measured from the circumferential direction,
   wherein the tilting angles of the cords of said cross-belt are smaller than the tilting angles of the cords of said belt protecting layer, and
   wherein a cushion rubber layer is disposed between the belt protecting layer and the spiral-belt, the thickness of the cushion rubber layer being in the range of 0.3 mm to 1.5 mm.

2. A radial tire for a motorcycle according to claim 1, wherein said belt protecting layer is placed outside the spiral-belt.

3. A radial tire for a motorcycle in claim 1, wherein the tilting angle of the cords of said belt protecting layer is set to 90 degrees measured from the circumferential direction.

4. A radial tire for a motorcycle in claim 1, wherein the elastic modulus of the cords arranged in said belt protecting layer is 12 cN/tex or more at 3% elongation.

5. A radial tire for a motorcycle in claim 2, wherein the tilting angle of the cords of said belt protecting layer is set to 90 degrees measured from the circumferential direction.

6. A radial tire for a motorcycle in claim 1, wherein the tilting angle of the cords of said belt protecting layer is set to 90 degrees measured from the circumferential direction.

7. A radial tire for a motorcycle in claim 2, wherein the elastic modulus of the cords arranged in said belt protecting layer is 12 cN/tex or more at 3% elongation.

8. A radial tire for a motorcycle in claim 1, wherein the elastic modulus of the cords arranged in said belt protecting layer is 12 cN/tex or more at 3% elongation.

9. A radial tire for a motorcycle in claim 3, wherein the elastic modulus of the cords arranged in said belt protecting layer is 12 cN/tex or more at 3% elongation.

* * * * *